(No Model.) 2 Sheets—Sheet 1.

H. DAINTY.
Apparatus for Burling Wool and Carbonizing Cotton in Mixed Rags.

No. 241,624. Patented May 17, 1881.

WITNESSES:
Chas. Nida.
C. Sedgwick.

INVENTOR:
H. Dainty
BY Munn & Co.
ATTORNEYS.

N. PETERS, Photo-Lithographer, Washington, D. C.

(No Model.)

H. DAINTY.

Apparatus for Burling Wool and Carbonizing Cotton in Mixed Rags.

No. 241,624. Patented May 17, 1881.

2 Sheets—Sheet 2.

WITNESSES:
Chas. Nida.
C. Sedgwick

INVENTOR:
H. Dainty
BY Munn & Co.
ATTORNEYS.

UNITED STATES PATENT OFFICE.

HENRY DAINTY, OF BROOKLYN, NEW YORK.

APPARATUS FOR BURLING WOOL AND CARBONIZING COTTON IN MIXED RAGS.

SPECIFICATION forming part of Letters Patent No. 241,624, dated May 17, 1881.

Application filed September 3, 1880. (No model.)

*To all whom it may concern:*

Be it known that I, HENRY DAINTY, of Brooklyn, in the county of Kings and State of New York, have invented a new and Improved Apparatus for Burling Wool and Carbonizing Cotton in Mixed Rags, of which the following is a specification.

Figure 1:
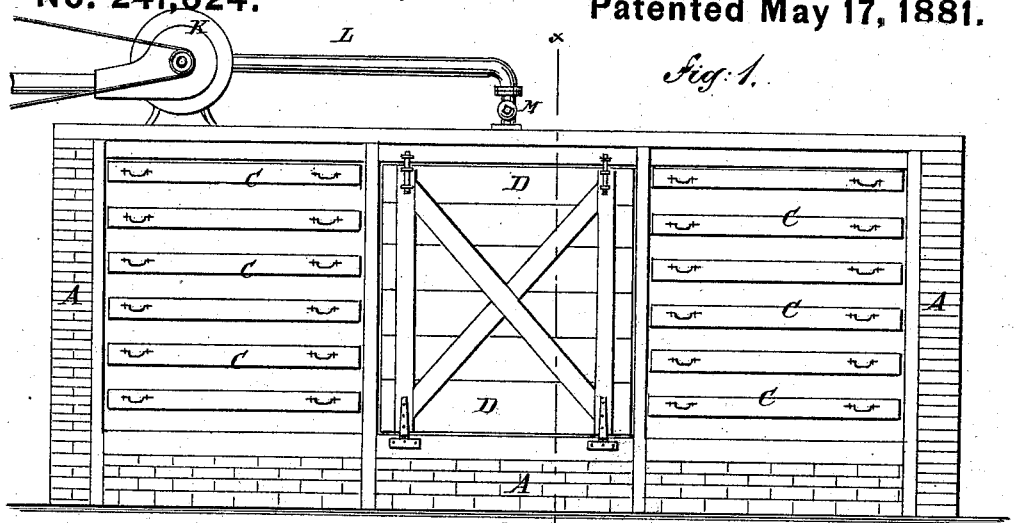
Figure 2:
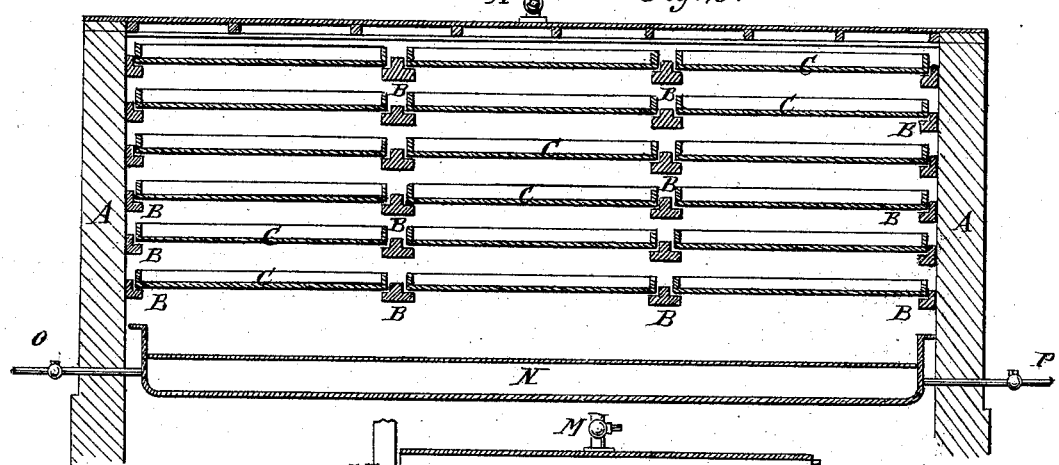
Figure 3:
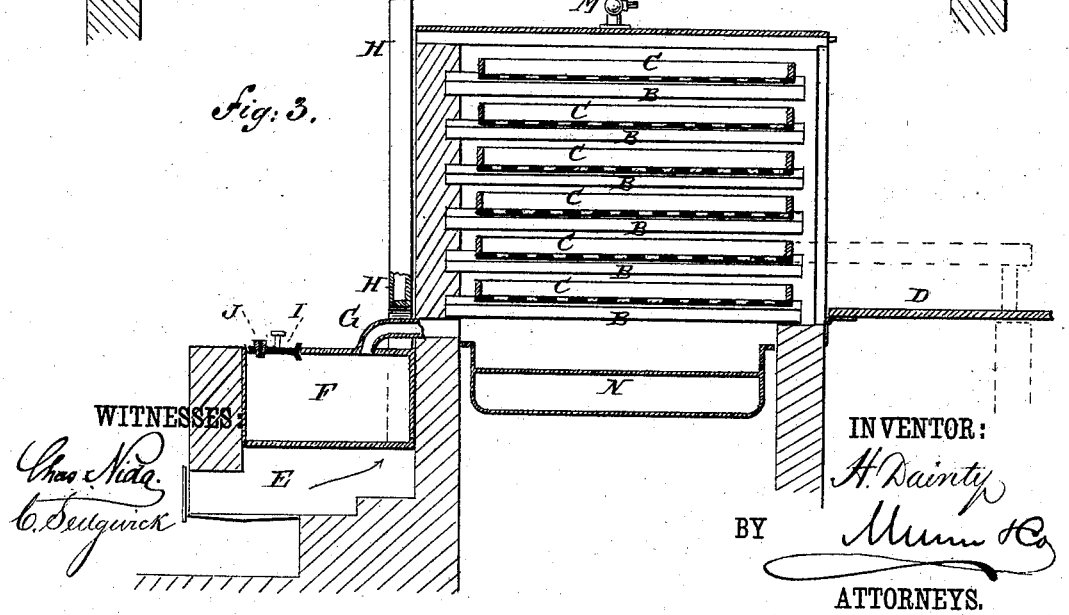
Figure 4:
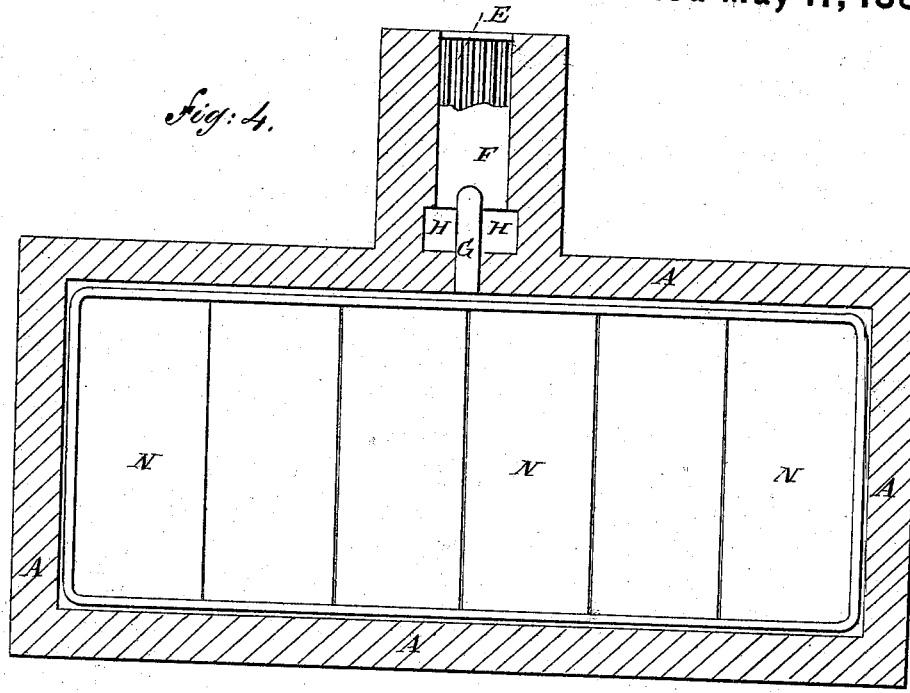
Figure 5:
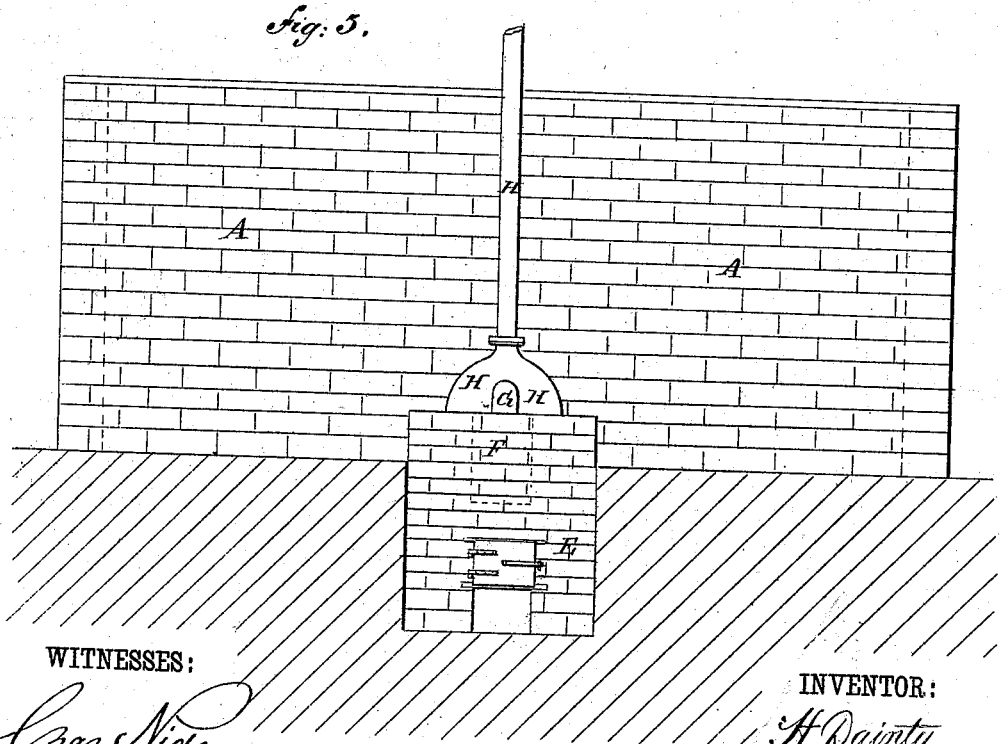

Figure 1, Sheet 1, is a front view of the apparatus, two of the doors being removed. Fig. 2, Sheet 1, is a sectional front elevation. Fig. 3, Sheet 1, is a sectional side elevation, taken through the line *x x*, Fig. 1. Fig. 4, Sheet 2, is a sectional plan view. Fig. 5, Sheet 2, is a rear elevation.

The object of this invention is to furnish an apparatus for burling wool and carbonizing cotton from mixed rags, so constructed that vegetable impurities and fibers can be removed or carbonized from the animal fibers in much less time and without any danger to the operator from the carbonizing-gas when emptying and refilling the apparatus.

The invention consists in constructing an apparatus for burling wool and carbonizing cotton in mixed rags, of a carbonizing-chamber having slides, drawers placed upon the slides to receive the material, doors hinged at their lower edges, a furnace, a gas-generating retort having gas-discharge pipe leading into the carbonizing-chamber, and detached cover for removing the refuse without drawing the fire, a smoke-flue surrounding the gas-discharge pipe, a steam-jacket for heating and drying the gas, and an exhaust-fan blower having its pipe provided with a valve for withdrawing the gas from the carbonizing-chamber when opened, to protect the workmen, as set forth.

A represents a chamber, of any desired size, built of bricks or any other suitable material, and lined with lead, asbestus, or other suitable substance that will be unaffected by the acid.

To the walls of the chamber A are attached bars B, to serve as slides for the drawers C, which drawers are made with slot or perforated bottoms to allow the gas to pass through them freely, and thus come in contact with all parts of the wool or rags placed in the said drawers.
The chamber A may be made with one or more tiers of drawers, C, as may be desired, or as the amount of work to be done may require. The front of the chamber A is closed with one or more doors, D, according as one or more tiers of drawers, C, are used. The doors D are hinged at their lower edges to the top of the low front wall of the chamber A, so that they can be swung down to serve as tables to support the drawers C when drawn out to be filled, emptied, and refilled, and in such positions that when swung down they may be upon a level with the bottoms of the lowest drawers, C, as shown in Fig. 3. The doors D are supported, when swung down or opened, by horses, hinged legs, or other suitable means. The lowest drawers, C, when drawn out, rest upon the doors D, and each succeeding upper drawer is supported in a horizontal position by a block placed between its outer part and the outer part of the preceding lower drawer. The doors D are secured when closed by bolts or other suitable means.

At the side or rear of the chamber A is built a furnace, E, in the upper part of which is set a retort, F, for generating the gas. The retort is made of cast-iron or sheet-iron and is lined with fire-brick. From the retort F a pipe, G, passes through the wall of the chamber A and opens into the interior of the chamber to introduce the gas. The smoke-flues H from the furnace E pass around the pipe G, as shown in Figs. 3, 4, and 5, to heat the gas as it passes into the chamber A.

In the forward part of the top of the retort F is formed an opening, through which the refuse can be removed from the said retort, and which is closed by a cover, I. The edges of the opening and of the cover I are rabbeted or flanged, so that the said cover will fit closely. In the cover I is formed an opening to receive the funnel, through which the acid is poured into the retort F, and which is closed by a wooden plug, J, having a small hole through it to admit sufficient air to drive the gas through the pipe G into the chamber A.

Upon the top of the chamber A, or upon some other suitable support, is placed an exhaust fanblower, K, from which a pipe, L, leads to an opening in the top of the chamber A. The pipe L is designed to be made of earthenware and to be covered or coated with fire-clay. The pipe L is provided with a valve, M, to be opened and closed when required. The fan-blower K can be driven from any convenient power.

In the lower part of the chamber A, below the drawers C and the gas-inlet pipe G, is placed a steam-jacket, N, which is provided with a pipe, O, to admit steam, and a pipe, P, to carry off the steam and the water of condensation. The steam-jacket N is designed to warm and dry the gas as it enters the chamber A, and thus make it act more quickly and effectively.

In case the chamber A is small the flues H from the furnace E may be led across the chamber A below the drawers C and back before passing to the chimney.

In case it is not convenient to use a steam-jacket, N, a furnace may be built at one side of the chamber A, with a flue extending across the said chamber and entering a chimney at its other side.

In case it is not convenient to use a fan-blower, K, a chimney may be built with a flue connected with an opening in the top of the chamber A, and provided with a closely-fitting damper, so constructed that it can be opened from the outside of the chamber A.

In using the apparatus, the drawers C are filled with the material to be operated upon, and are inserted in place and the doors D are closed. The fire is started in the furnace E, and sufficient salt is put into the retort F to generate enough gas to fill the chamber A. Sulphuric acid, in the proportion of one hundred and ten parts of acid to one hundred parts of salt, is poured upon the salt through a funnel inserted in the hole in the cover I, and the funnel is removed and the wooden plug is inserted. When the carbonizing is completed, which is usually in from four to five hours, the valve M is opened and the fan-blower K is started. The doors D can then be opened and the drawers C drawn out, emptied, refilled, and again inserted and the doors D closed without any annoyance to the workmen from the escape of gas from the chamber, the action of the fan-blower, together with the inrush of air through the open doors, carrying off all the gas. The cover I can then be taken off, the refuse removed from the retort F, and the retort recharged and the operation repeated, there being no necessity for waiting for the chamber or apparatus to cool down or for drawing the fire from the furnace E.

Having thus described my invention, I claim as new and desire to secure by Letters Patent—

1. An apparatus for burling wool and carbonizing cotton in mixed rags, constructed substantially as herein shown and described, consisting of the chamber A, having slides B, the drawers C, to receive the material, the doors D, hinged at their lower edges, the furnace E, the retort F, having gas-discharge pipe G leading into chamber A, and detached cover I, the smoke-flue H, surrounding the pipe G, the exhaust fan-blower K, having pipe L, provided with a valve, M, and the steam-jacket N, as set forth.

2. In an apparatus for burling wool and carbonizing cotton in mixed rags, the smoke-flue H, constructed to surround the gas-discharge flue G, substantially as herein shown and described, whereby the gas is heated before being introduced into the carbonizing-chamber, as set forth.

3. The combination, with the carbonizing-chamber A, of the steam-jacket N, placed beneath the drawers C, and the gas-inlet pipe G, whereby the gas is heated and dried as it is introduced into the carbonizing-chamber, as set forth.

HENRY DAINTY.

Witnesses:
JAMES T. GRAHAM,
C. SEDGWICK.